United States Patent
Oldenburg (12) 
(10) Patent No.: US 6,640,891 B1
(45) Date of Patent: Nov. 4, 2003

(54) RAPID THERMAL CYCLING DEVICE

(76) Inventor: Kevin R. Oldenburg, 6 Lafayette Pl., Chadds Ford, PA (US) 19317

( * ) Notice: Subject to any disclaimer, the term of this patent is extended or adjusted under 35 U.S.C. 154(b) by 0 days.

(21) Appl. No.: 09/655,021

(22) Filed: Sep. 5, 2000

(51) Int. Cl.[7] .......................... C12M 3/00; G05D 23/00
(52) U.S. Cl. ...................... 165/253; 165/48.1; 165/61; 422/102; 422/109; 435/286.1; 435/288.4; 435/305.4; 435/809
(58) Field of Search .......................... 165/48.1, 61, 63, 165/64, 185, 253; 422/67, 102, 109, 101; 435/286.1, 286.6, 288.3, 288.4, 305.1, 305.2, 305.3, 305.4, 307.1, 809

(56) References Cited

U.S. PATENT DOCUMENTS

| 1,006,767 | A | 10/1911 | Mauger |
| 1,456,005 | A | 5/1923 | Harris |
| 2,379,474 | A | 7/1945 | Bramson |

(List continued on next page.)

OTHER PUBLICATIONS

Merriam–Webster's Collegiate Dictionary, Tenth Edition, Merriam–Webster, Incorporated, 1996, p. 959.*
Constans, Aileen, "Some like it Hot: A Thermal Cycler Roundup", The Scientist, 15[24]:32, Dec. 10, 2001, pp. 1–7.*
Soper, Williams, Lassiter, Zhang and Ford. 1998 Sanger DNA–sequencing reactions performed in a solid–phase nanocreactor directly coupled to capillary gel electrophoresis. Anal. Chem. 70, 4036–4043.
Wilding, Shoffner and Kricka. 1994 PCR in a Silicon Microstructure. Clin. Chem. 40, 1815–1818.
Chapin and Lauderdale, 1997 Evaluation of a Rapid Thermal Cycler for Detection of *Mycobacterium tuberculosis*. J. Clin. Micro. 2157–2159.
Mai, Barnes, Vafiadis and Polychronakos, 1998 Shortened PCR Cycles In A Conventional Thermal Cycle. Biotechniques 25, 208–210.
Wittwer and Garling, 1991 Rapid Cycle DNA Amplification: Time and Temperature Optimization. Biotechniques 10, 76–83.
Wittwer, Fillmore and Garling, 1990 Minimizing the Time Required for DNA Amplification by Efficient Heat Transfer to Small Samples. Anal. Biochem 186, 328–3331.
Cao, 1989 A simple and Inexpensive System to Amplify DNA by PCR. Biotechniques 7:6, 566–567.
Perry, and Green, 1997 Heat Transfer by Radiation. Perry's Chemical Engineers' Handbook $7^{th}$ Ed., 5–23 to 5–42.
Weis, Tan, Martin and Wittwer, 1992 Detection of Rare mRNAs via Quantitative RT–PCR. Trends in Gen. 8:8, 263–264.

(List continued on next page.)

Primary Examiner—Ljiljana Ciric
(74) Attorney, Agent, or Firm—Robert S. Lipton, Esq.; Lipton, Weinberger & Husick (57) ABSTRACT

A thermal cycling device consisting of a plate containing a plurality of wells to hold liquid and a lid that covers the plate and contains a number of "pins" that insert into the wells of the plate to control the temperature of the sample in the well. Biological, chemical or other samples are placed into the wells of the plate and the lid is placed on the plate with the pins inserted into or in the proximity of the sample. The lid, the outer surface of which may be copper clad and in direct contract with the pins, is heated or cooled, rapidly and uniformly heating or cooling the biological samples. The temperature of the sample can be rapidly and uniformly cycled and is particularly useful for the amplification of DNA via the polymerase chain reaction.

10 Claims, 10 Drawing Sheets

U.S. PATENT DOCUMENTS

| | | | |
|---|---|---|---|
| 3,616,264 A | 10/1971 | Ray et al. | 195/127 |
| 4,038,055 A | 7/1977 | Varano et al. | 55/197 |
| 4,116,777 A | 9/1978 | Takátsky et al. | 195/127 |
| 4,286,456 A | 9/1981 | Sisti et al. | 73/23.1 |
| 4,420,679 A | 12/1983 | Howe | 219/400 |
| 4,468,423 A | 8/1984 | Hall | 428/72 |
| 4,481,405 A | 11/1984 | Malick | 219/405 |
| 4,683,195 A | 7/1987 | Mullis et al. | 435/6 |
| 4,683,202 A | 7/1987 | Mullis et al. | 435/91 |
| 4,701,415 A | 10/1987 | Dutton et al. | 435/289 |
| 4,865,986 A | 9/1989 | Coy et al. | 435/290 |
| 4,889,818 A | 12/1989 | Gelfand et al. | 435/194 |
| 4,902,624 A | 2/1990 | Columbus et al. | 435/316 |
| 4,965,188 A | 10/1990 | Mullis et al. | 435/6 |
| 4,981,801 A | 1/1991 | Suzuki et al. | 435/290 |
| 5,038,852 A | 8/1991 | Johnson et al. | 165/12 |
| 5,061,630 A | 10/1991 | Knopf et al. | 435/290 |
| 5,236,666 A | 8/1993 | Hulette et al. | 422/65 |
| 5,333,675 A | 8/1994 | Mullis et al. | 165/12 |
| 5,432,086 A | 7/1995 | Fränzl et al. | 435/291 |
| 5,455,175 A | 10/1995 | Wittwer et al. | 435/286.1 |
| 5,489,532 A * | 2/1996 | Charm et al. | 165/48.1 |
| 5,525,300 A | 6/1996 | Danssaert et al. | 422/99 |
| 5,602,756 A | 2/1997 | Atwood et al. | 364/500 |
| 5,604,130 A | 2/1997 | Warner et al. | 435/286.7 |
| 5,681,492 A | 10/1997 | Van Praet | 219/400 |
| 5,716,842 A | 2/1998 | Baier et al. | 435/283.1 |
| 5,721,136 A | 2/1998 | Finney et al. | 435/287.2 |
| 5,819,842 A | 10/1998 | Potter et al. | 165/206 |
| 5,863,507 A | 1/1999 | James | 422/104 |
| 5,939,312 A | 8/1999 | Baier et al. | 435/287.2 |
| 6,153,426 A | 11/2000 | Heimberg | 435/287.2 |
| 6,171,850 B1 | 1/2001 | Nagle et al. | 435/286.2 |
| 6,197,575 B1 * | 3/2001 | Griffith et al. | 435/288.4 |
| 6,312,960 B1 * | 11/2001 | Balch et al. | 435/286.1 X |
| 6,331,441 B1 * | 12/2001 | Balch et al. | 435/288.4 X |
| 6,338,802 B1 * | 1/2002 | Bodner et al. | 422/101 X |
| 6,423,536 B1 * | 7/2002 | Jovanovich et al. | 435/288.4 X |
| 6,451,261 B1 * | 9/2002 | Bodner et al. | |
| 6,479,301 B1 * | 11/2002 | Balch et al. | 435/286.6 |
| 6,489,112 B1 * | 12/2002 | Hadd et al. | |

OTHER PUBLICATIONS

*Tret'iakov, Pantina, Kaboev, 1997 Fast DNA amplification in small ultra–thin wall microplates. Bioorg. Khim 23, 526–528.

*Civitello, Richards and Gibbs, 1992 A simple protocol for the automation of DNA cycle sequencing reactions and polymerase chain reactions. DNA Seq. 3, 170–23.

Tretyakov, Pantina, and Kaboev 1997, Fast DNA Amplification in Tiny Ultrathin Microplates, Bioorganicheskaya Khimiya, vol. 23, No. 6, pp. 526–528.

Civitello, Richards and Gibbs, A Simple Protocol for the Automation of DNA cycle Sequencing Reactions and Polymerase Chain Reactions, vol. 3, pp. 17–23, 1992.

* cited by examiner

RAPID THERMAL CYCLING DEVICE

FIELD OF THE INVENTION

This invention relates generally to a thermal cycling device and, more specifically, to an apparatus for the rapid heating and cooling of liquid samples.

BACKGROUND OF THE INVENTION

A thermal cycling device is an apparatus used to continuously change the temperature of a liquid sample. As used herein, the term "liquid" refers to pure liquids, as well as liquids containing particulate matter (especially biological material) and solvents containing solute.

Thermal cycling devices are well-known in the art and specific embodiments have been described in the scientific and patent literature. These devices fall into two general categories.

The first category is a system based on the heating or cooling of a metal block typically either by moving a fluid through the block or by the addition of peltier heating directly to the block. A number of individual plastic tubes, a well plate (or a microliter plate which consists, essentially, of a number of plastic tubes connected together in a rectangular array) are used to hold the liquid samples. The plastic tubes are placed in the block and the temperature of the sample is regulated by changing the temperature of the metal block. The rate at which the temperature can be changed is limited by the relatively large thermal mass of the metal block. This being the case, the maximal rate of temperature change is relatively slow due to the fact that heat has to be added or removed from a relatively large thermal mass and this mass takes a significant time to reach thermal equilibrium. A second disadvantage of this category of thermal cyclers is that the liquid samples to be heated or cooled are "insulated" from the block by the plastic wall of the sample container (i.e., by the plastic tubes). Since plastic is a good insulator, not only must the heating and cooling source overcome the thermal mass of the metal block, but it must also overcome the insulating properties of the plastic sample container.

The sample containers currently in use for polymerase chain reaction (PCR) and Cycle Sequencing are either thin walled microfuge tubes, thin walled microwell plates—usually either 96-well or 384-well—or microcapillary tubes. All of these containers suffer from a common problem in that in all cases, the samples are heated or cooled from an external source and the heating and cooling system must overcome the insulating properties of the container.

A related problem with these devices is that the plastic tubes are quite large in comparison to the liquid sample. For example, when a 96-well plate or 384-well plate is used in these systems, the container volume ranges from 300 microliters ($\mu$l) to 120 $\mu$l whereas the sample volume is usually only 5–25 $\mu$l. When a sample is heated during a polymerase chain reaction (PCR) cycle, the liquid will evaporate and condense on the interior wall surfaces of the sample container. Loss of liquid from the sample will change the concentrations of the reaction components and lead to spurious results.

Specific measures have been taken to overcome the serious problem of evaporation and condensation. One solution is to place a lid over the sample container or well plate. A heated well-plate is placed in contact with the sample container lid and heated to 20–30° C. higher than the sample temperature. This will minimize the condensation of the liquid on the walls and surface of the container but does nothing for the total evaporation since the air volume within the sample container is large and can hold a significant amount of liquid vapor (from 0.06–0.15 $\mu$l), especially at these elevated temperatures. In a 25 $\mu$l reaction volume, this liquid loss may not have a significant effect, however, when the reaction volume approaches 1 $\mu$l, a loss of 15% of the liquid volume will adversely affect the reaction.

A number of manufacturers currently produce thermal cyclers that utilize a metal block for heating and cooling liquid samples. These include MJ Research, Techne, Lab Line, Thermolyne, Corbett Research, and Hybaid.

The second type of thermal cycling device involves the use of microcapillary tubes that are placed in a chamber, and heating the chamber by forcing hot air or cold air into the chamber. This method is somewhat similar to heating the samples with a convection oven and cooling the samples with a refrigeration system. A current manufacturer of this type of thermal cycler is Idaho Technologies.

This second type of thermal cycling device has the advantage that the thermal mass that needs to be heated is relatively small, i.e, the capillary tube, sample, and the interior of the chamber. However, this system has a number of limitations. First, the samples need to be sealed within a glass capillary tube. This requires that the sample be drawn into the tube via capillary action then the end of the tube has to be sealed with a flame hot enough to melt the glass. Capillary tubes by their very nature are difficult to manipulate and are not suitable to robotic automation. That is, while a limited number of samples can be prepared in this fashion, it would be extremely difficult, if not impossible to process the number of samples per day (usually on the order of 100,000 that are usually necessary for a particular study). Second, glass is a fairly good insulator so, similar to the problem described above with the plastic tubes, this system is also limited in that in order to heat or cool the sample, the insulating properties of the container must be overcome.

One of the biggest drawbacks of the commonly used polypropylene microwell plates is that the material changes shape upon repeated heating and cooling cycles. For example, upon heating a standard polypropylene microwell plate to 95° C. and cooling back to room temperature, the plastic may deform by as much as 1 cm from corner to corner. The result of this is that the plate cannot be used directly on standard laboratory automation—for example, a 96 or 384 channel pipettor would hit the bottom of the wells on one corner of the plate yet remain up to 1 cm from the bottom of the other corner of the plate. To compensate for this, the samples are typically moved, singly, into a plate that has not been subjected to thermal cycling or the plate is forced into a retaining device that will hold the plate in the proper shape.

Microcapillaries as a container for PCR and Cycle Sequencing have an associated set of problems. First and foremost is the fact that these containers are not automation friendly. That is, it is difficult if not impossible for robotic liquid handlers to place liquid within a capillary. Consequently, the liquid handling is typically performed in a microfuge tube or microwell plate; then the capillary is brought into contact with the liquid and the liquid is drawn into the capillary by capillary action. This negates one of the presumed advantages of the capillary system in that a significantly larger volume of reagent must be prepared even though only a small portion of that reagent is used within the capillary. Another problem with capillaries is that they are difficult to seal. Each capillary typically has to be heat sealed to melt the glass capillary. Even if other types of materials are used for the capillaries, sealing is difficult and not amenable to automation. Finally, after the reaction has taken place, the capillary must be broken or cut and the reaction product removed. Since the sample is held within the capillary by capillary action, the removal of the sample is difficult at best.

In order to increase throughput and decrease the volume of the reaction, there is a desire to move from 384-well plates to 1536-well plates. This will allow a four-fold increase in density and throughput and, because the volume of the well is much smaller (75 microliters in a 384-well plate vs. ˜6 microliters in a 1536 well plate) the reactions can be performed at 1 microliter vs. the typical 5–25 microliters that is currently performed in 384-well plates. The miniaturization from a 384-well system to a 1536-well system will yield about a 5–25 fold reagent savings. These two advancements over the current methods will yield nearly a 100-fold improvement in reagent savings and throughput.

Commercially available 1536-well plates are not conducive to the current methods of thermal cycling. There are several reasons for this. With a very high well density and a center to center spacing of 2.25 millimeters the inter-well distance is approximately 0.5 millimeters. This small distance makes it nearly impossible to surround each well with a heating/cooling unit as is currently done in 96-well or 384-well systems. Also, the plastic surface area to volume ratio is approximately 7-fold higher than in a 96-well plate or 384-well plate. With the increased plastic area, the insulating properties of the plastic that comprises the well is very difficult to overcome. Heating the plate from just the bottom is not practical since this causes temperature gradients within the well and consequently non-uniform heating.

Typically, PCR and other methods have involved placing the samples in a small microtube and then placing the microtube in a water bath or heat block for temperature regulation. This method of controlling the temperature of the reaction has been successfully used on single tubes, 96-well plates, and 384-well plates. However, as the well density increases, it becomes difficult to surround each well with uniform temperature control. Moreover, plastics typically act as excellent insulators so the external heating and cooling system has to overcome the insulating properties of the plastic before an effect on the solution is observed. An additional problem is that the solution volume is very small in comparison to the total well volume. Consequently, when the well is heated, the solution tends to evaporate and then condense on the cover of the well. This causes the concentration of the various components in the well to change and can adversely affect the reaction. To compensate for this problem, many systems heat the covers so that condensation on this surface is limited. An additional problem is that as the well density increases from 96-well plates to 384-well plates, the plates tend to warp and become misshapen during the heating and cooling cycles. This warping of the plates makes it difficult for them to be handled effectively by robotic or automated systems—an absolute requirement for high throughput.

SUMMARY OF THE INVENTION

The present invention can be divided into two embodiments. The first embodiment consists of a device for heating and cooling a lid that is designed to fit over a well plate. There are two variations for this lid heating/cooling system. First, one air source passing over a heating coil and another air source passing over a cooling unit (air conditioning) are proportionally mixed in order to regulate the temperature. The mixed air is directed via a series of ducts such that it heats or cools the surface of the lid in a uniform and highly controlled fashion. The second method is to bring a heating/cooling source, such as a Peltier device or heat/cold block in direct contact with the surface of the lid. The large thermal mass of the heat/cold block will rapidly add or remove heat from the samples via the pins inserted into the sample.

The second embodiment is a device, in particular a well-plate containing, for example, 1536-wells with each well having a volume of approximately 6 µl, and a mating plate lid. The lid to this plate may have a copper clad surface and may contain a rubber seal on the other surface. Protruding through this lid is a series of "pins" that extend approximately from the rubber surface and which communicate with the copper clad surface for transferring heat from the lid. The device in the first embodiment heats or cools the copper clad surface and pins of the device in the second embodiment. The copper clad surface and pins rapidly transfers heat or removes heat from the pins. The pins in turn transfer heat or remove heat from the sample.

The present invention describes a device whereby the wells of a 1536-well plate, for example, can be uniformly heated by applying a heating or cooling source directly into the well via the lid; the pins are either in direct contact with the liquid sample(s) or near the liquid sample(s) such that it can conduct heat into or out of the sample.

BRIEF DESCRIPTION OF THE DRAWINGS

The accompanying drawings, which are incorporated in and form a part of the specification, illustrate the embodiments of the present invention and, together with the description, serve to explain the principles of the invention.

DETAILED DESCRIPTION OF THE PREFERRED EMBODIMENT

In describing a preferred embodiment of the invention, specific terminology will be selected for the sake of clarity.

However, the invention is not intended to be limited to the specific terms so selected, and it is to be understood that each specific term includes all technical equivalents that operate in a similar manner to accomplish a similar purpose.

Figure 1:
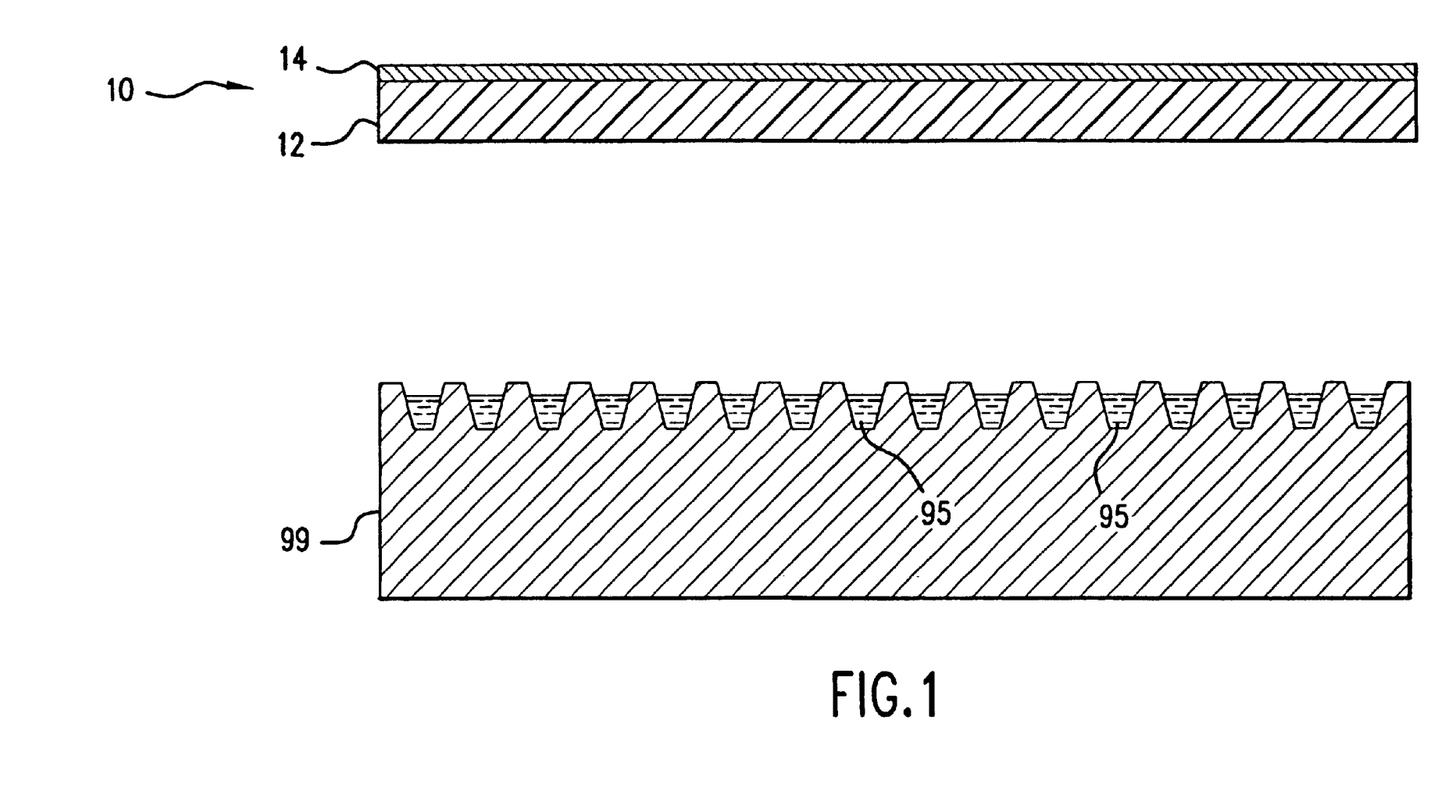
FIG. 1 illustrates a lid having a copper clad surface on one side in accordance with the present invention.

Referring to FIG. 1, the subject invention consists of a lid 10 that transmits heat to liquid samples 95 that are stored in a well-plate 99. In a preferred embodiment, a means for regulating the temperature of the lid 10 may be included with the heat-transmitting lid.

The lid 10 must be able to conduct heat. In a first preferred embodiment, the lid 10 is constructed from a circuit board type material, which gives the lid rigidity. A circuit board is typically made of a polymer base 12 and may have a copper clad layer 14 as illustrated in FIG. 1. In actuality, the clad layer may be any suitable metal and, preferably, is a material that conducts heat.

The lid 10 is preferably adapted to be frictionally or matingly fitted over a well-plate 99. A means for heating and cooling the lid is applied to the lid 10. The close proximity of the lid 10 to the liquid samples 95 in the well-plate 99 controls the temperature of the liquid samples. This embodiment is the most basic embodiment in accordance with the present invention. If the lid has a cooper clad surface it is on the "top" side of the lid, away from the liquid samples. The cooper clad surface will distribute the heat more evenly over the lid 10 but is not crucial to this embodiment.

Figure 2A:
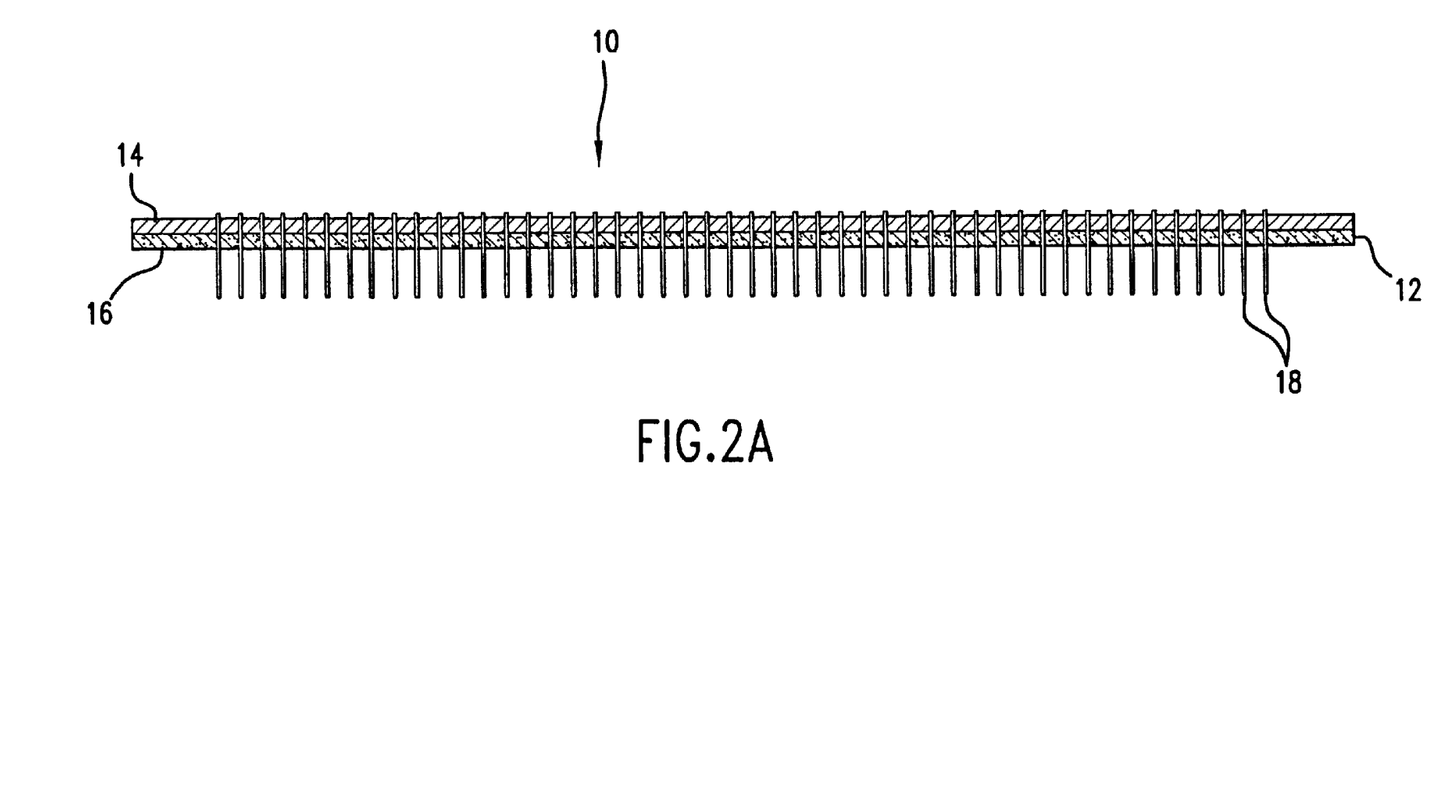
FIG. 2A illustrates a lid, in accordance with the present invention, having a copper silicone rubber layer applied to the bottom surface and pins through the lid.
Figure 2B:
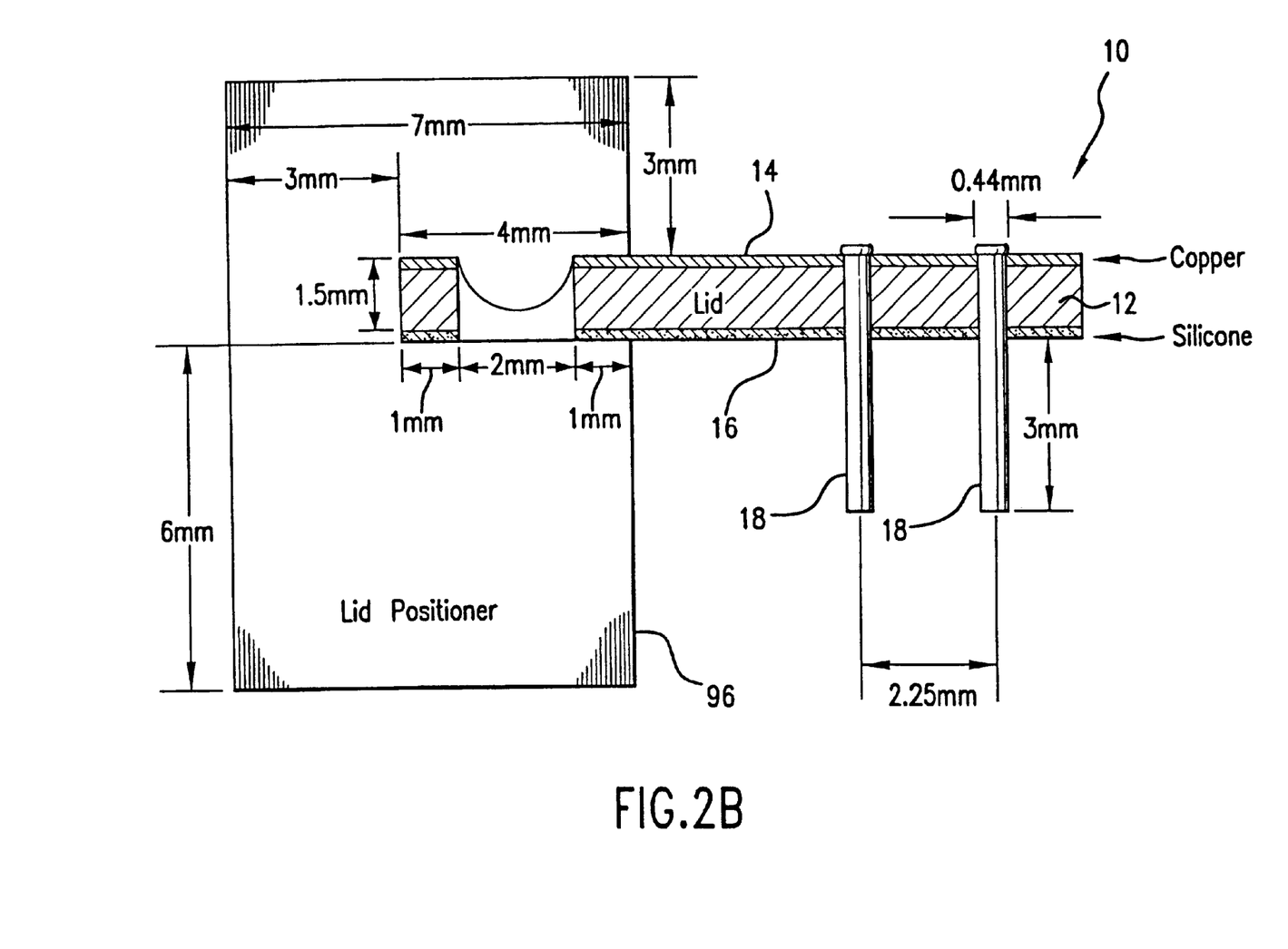
FIG. 2B is an enlarged view of the lid illustrated in FIG. 2A.
Figure 3:
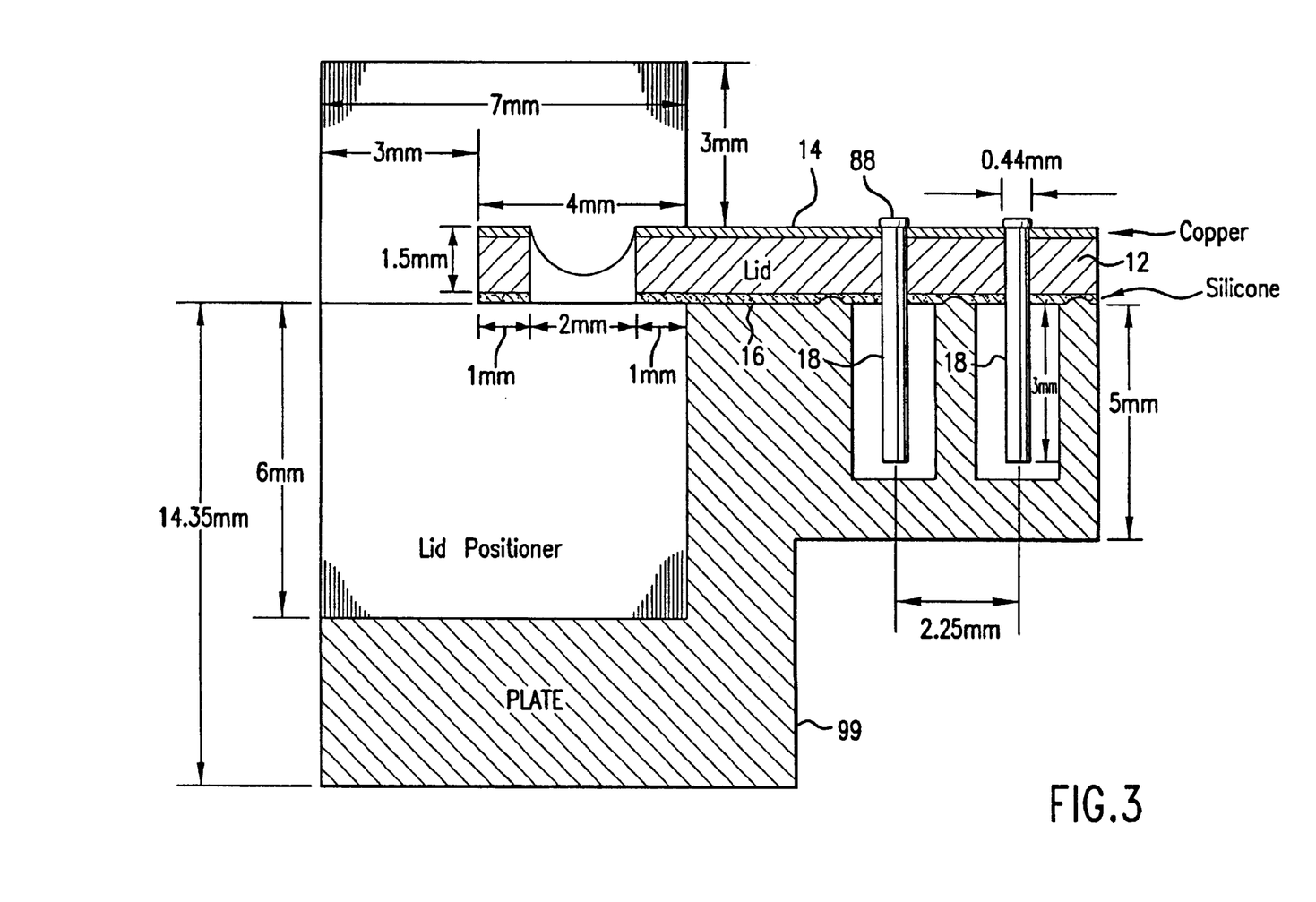
FIG. 3 is a side view similar to FIG. 2 illustrating the position of the lid with pins with respect to the well-plate.

Referring now to FIGS. 2A, 2B and 3, a second primary embodiment is illustrated. The base 12 of the lid 10 has a copper clad upper or top layer 14. As discussed before, the copper clad layer 14 is useful in evenly distributing heat across the entire upper surface of the lid 10. The side opposite of the copper clad may be coated with a thin layer of silicone rubber 16 or a similar material. The silicone rubber coating 16 helps to seal the lid onto the well-plate 99 thereby inhibiting water loss (evaporation) of the solution during the repeated heating and cooling cycles. However, if the lid 10 is designed to frictionally engage the well-plate 99, only a perimeter coating of silicone rubber or no silicone rubber may be needed.

One or more pins 18 communicate with the copper clad surface of the lid 10 in order to transmit heat from the top of the lid along the length of the pins 18.

Figure 4:
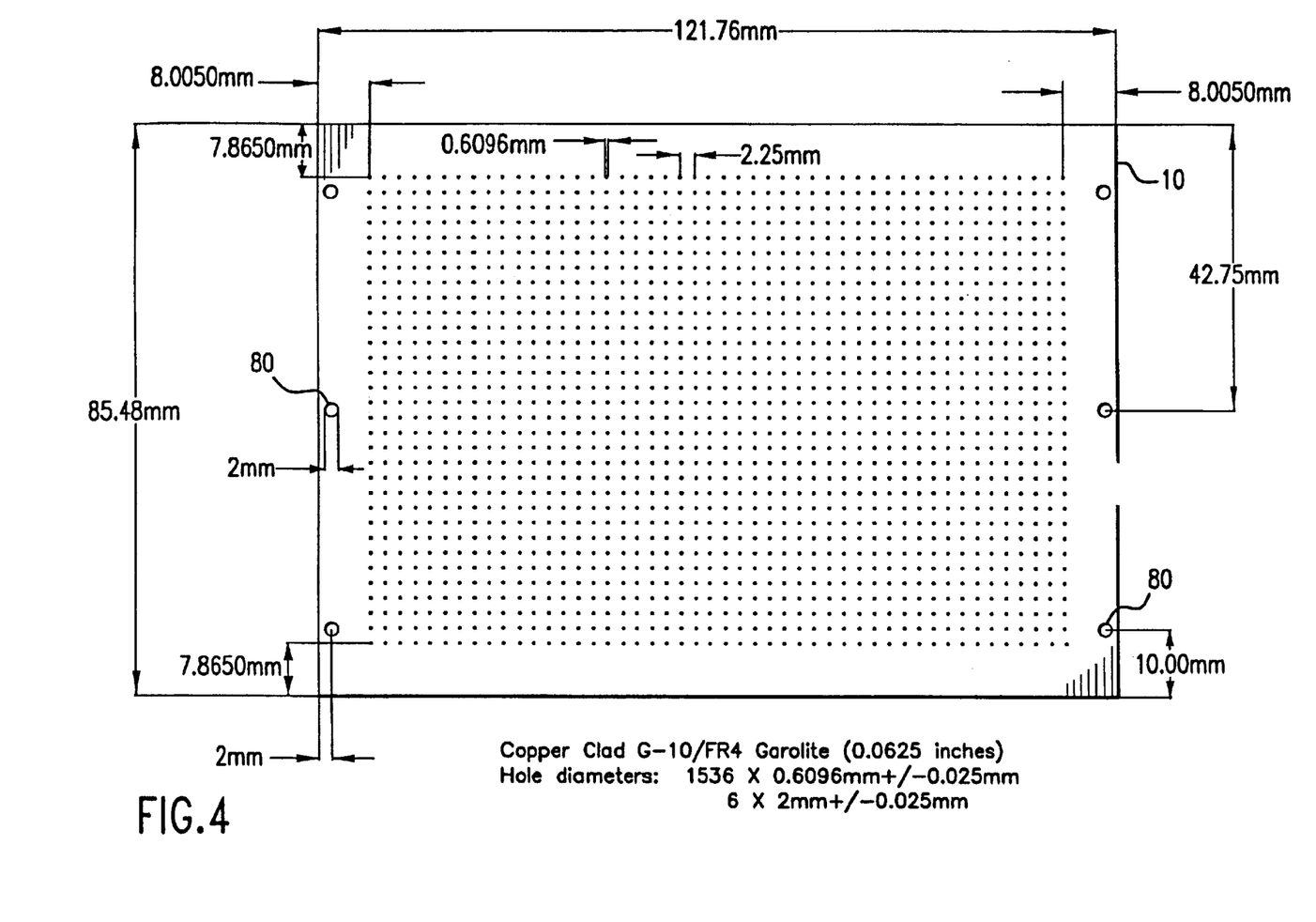
FIG. 4 is a hole positioning on the lid for insertion of the 32 by 48 pin array and locators for the plate positioning component.

In a preferred embodiment, a plurality of holes, substantially the diameter of the pins 18 that will be used, are drilled into the lid 10 on a dimensional array that corresponds to the dimensions of the well plate 99 that will be used. For example, for a 1536-well plate having a 32 by 48 array of wells, the holes would be drilled in a 32 by 48 array with a center to center spacing of 2.25 millimeters as illustrated in FIG. 4. The 1536 pins 18 are then inserted through these holes such that they protrude beyond the silicone seal as illustrated in FIGS. 2A, 2B and 3. Based on the depth of a standard 1536-well plate, the pins will protrude approximately 3 mm from the bottom surface of the lid 10.

Figure 5:
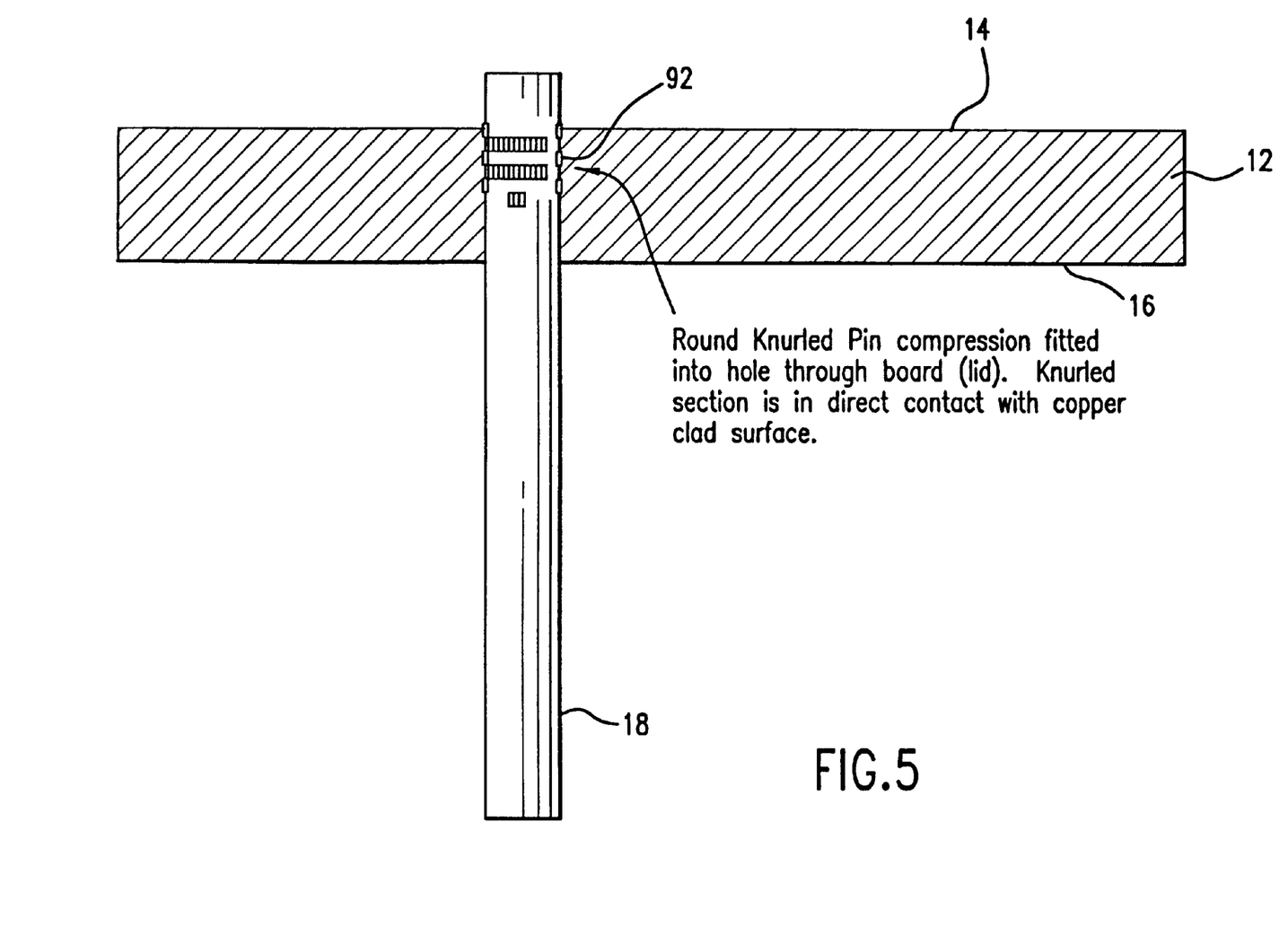
FIG. 5 illustrates a compression fitting of the pin such that it is firmly seated in the hole in the lid and in direct contact with the copper clad surface.

The pins are compression fit into the lid 10 such that each pin is in direct contact with the copper clad as illustrated in FIG. 5. In order to achieve this, Knurls may be formed proximate the top of each pin 18. In addition, a head on each pin 18 may prevent it from sliding completely through the hole. It will be appreciated by those skilled in the art that other means for attaching the pins may be used, for example, soldering the top of each pin to the copper clad surface 14.

The pins may or may not protrude from the side with the copper clad (i.e., the top side of the lid). If the pins do protrude above the copper clad surface of the lid, it should preferably not exceed 0.2 mm.

The pins can be constructed from any material that is capable of conducting heat. In the preferred embodiment, the pins are constructed from tin/lead coated brass wire. Other materials such as aluminum, gold, copper, or other metals could be used along with certain ceramics and plastics.

A portion of the pin 18 that extends from the bottom side of the lid is designed to make contact with the sample stored in the respective well. (see FIG. 3). It would be obvious to one skilled in the art that the pin lengths and the amount of liquid sample may be adjusted to ensure that the pins are at least partially submerged in the liquid sample. Accordingly, as the temperature of the lid is changed, the temperature of the pins change, thereby directly heating or cooling the sample.

An advantage of this system is the volume of the heating/cooling device, "pin", versus the volume of the sample. In this system, the heating/cooling device that is inserted directly into the sample has a volume of approximately 10% of the liquid volume. This comparatively large volume pin insures rapid temperature equilibrium in the sample. Also, the pin 18 can be designed to maximize surface area such that heat transfer between the liquid sample and the pin is optimized. The larger the pin cross sectional area, the faster the heat transfer.

It would be understood by one skilled in the art that if the pin 18 directly contacts the liquid sample, then the temperature of the sample may be more quickly brought to a desired temperature. However, if the pins are designed so that they do not directly contact the liquid sample, the temperature of the sample will still change because of each sample's proximity to its respective pin 18.

In some circumstances, the metal pins may need to be coated with a plastic or other inert material so that the metal will not interfere with the reaction that is to occur in the samples. If this is the case, the pins can be coated with gold, polypropylene, polystyrene, or other metals, plastics or ceramics that are biologically inert.

The pins in the preferred embodiment are cylindrical in shape. However, rectangular, hexagonal, elliptical, star or other shaped rods could also be used.

The tip of the pin that protrudes into the liquid can be concave or convex, have ridges or other structures that can trap small quantities of liquid. One advantage of this system is that after the PCR or cycle sequencing reaction is complete, the lid can be removed and used as a storage device for a small amount of the material in the well. If the reaction needs to be repeated the lid can be reused to generate a new sample by the small quantities of the samples attached to the pins. The lid 10 can also be used to place small amounts of sample onto other substrates.

If the lid 10 is clad in metal, then the pins can be heated either by row, column, or individually, simply by cutting the metal clad such that there are two or more separate areas that can be heated or cooled individually. In this case, the thermal cycler could be constructed in the form of a Peltier device such that the Peltier could be brought into direct contact with a row or column of pins.

Figure 6:
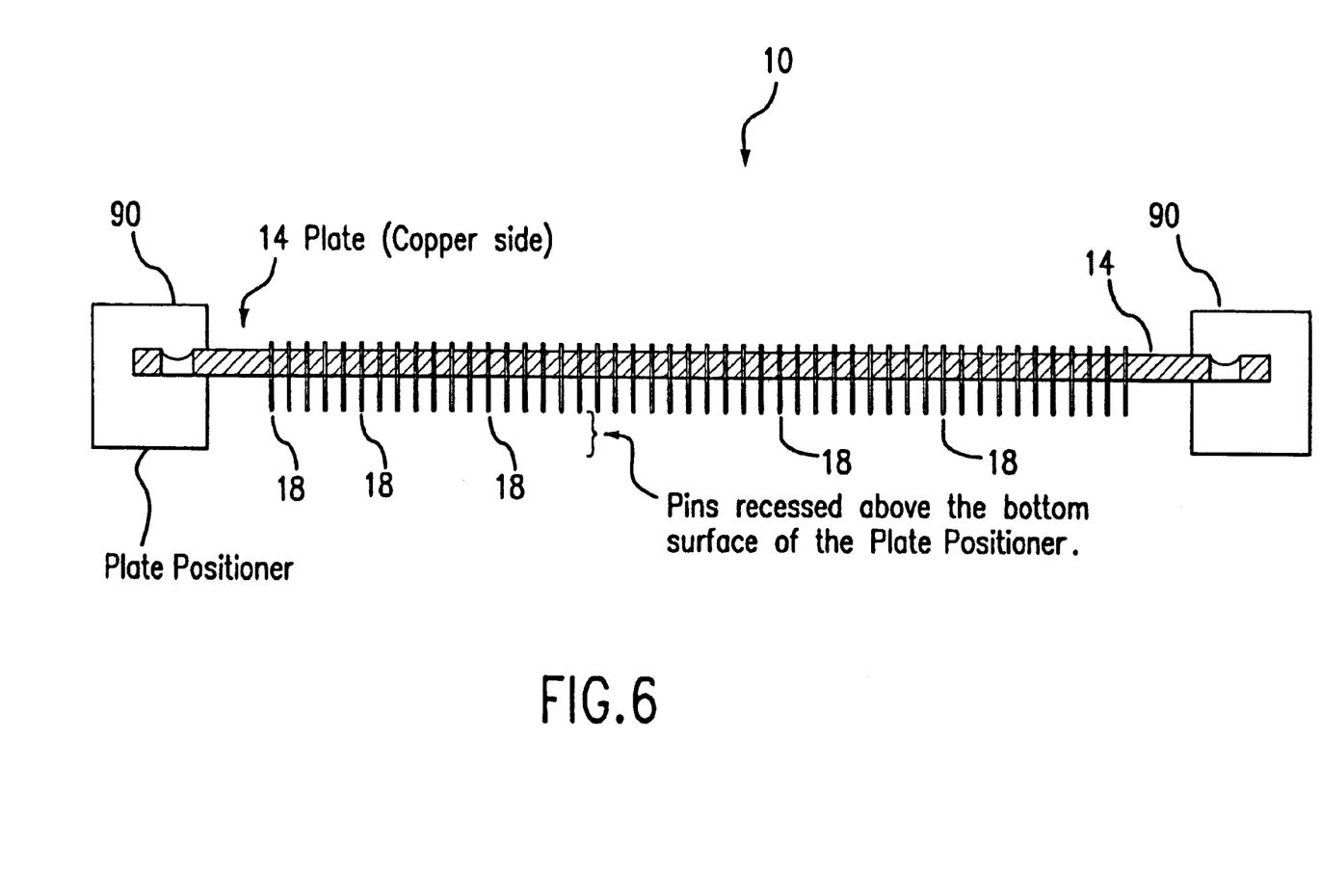
FIG. 6 is a perspective view of a plate positioning component and its role in protecting the pin array from damage.

Referring to FIGS. 2A, 3 and 6, the lid 10 includes two or more plastic ears 90 that serve several purposes. First, these plastic pieces are used to position the lid on the plate such that the pins are inserted directly into the corresponding well. These plastic ears 90 also serve to protect the pins both from contamination and from potential damage as illustrated in FIG. 6.

The actual thermal mass that needs to be heated or cooled in this device is very small and includes the thin sheet of copper clad on the surface of the lid and the pin array. This low thermal mass allows the temperature of the system to be changed very rapidly and thermal equilibrium will be reached rapidly.

The 1536-well plate is constructed based on the Proposed Society for Biomolecular Screening (SBS) standard plate configuration. The overall dimensions of the plate are: 85.48 mm in width, 127.76 mm in length, and 14.75 mm in height. The well-to-well spacing on the 1536-well plate is 2.25 mm center to center and on the 384-well plate is 4.5 mm center to center. The plate meets the SBS standard in all aspects except for the positioning slots 80 illustrated in FIG. 4 to accept the PCR lid. On both short sides of the plate, positioning slots are formed such that the lid 10 can be positioned directly upon the plate without the heating/cooling pins contacting the side walls of the wells.

Figure 7:
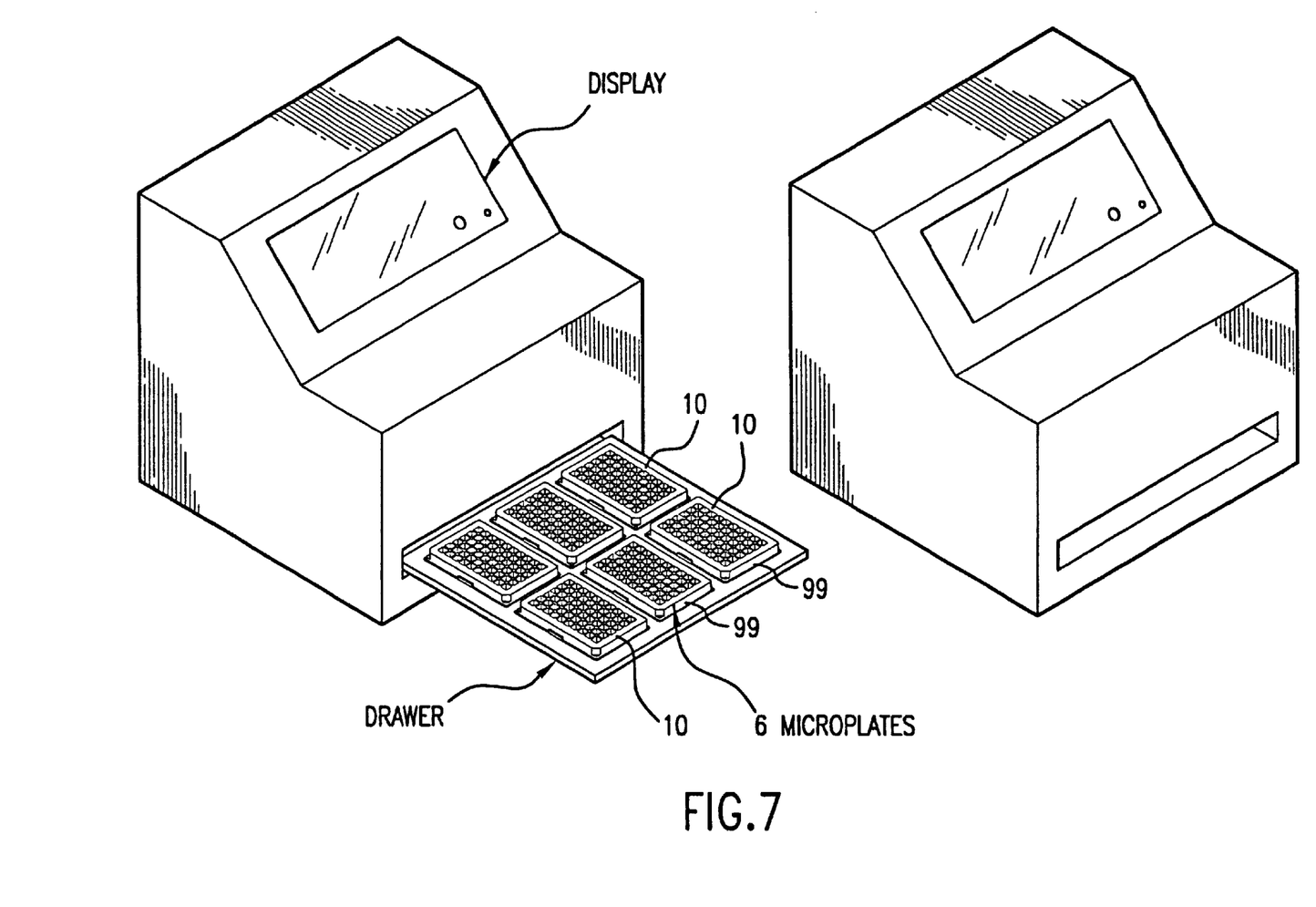
FIG. 7 is a perspective view of a means that can apply heat or remove heat from the lids.

An automated device for positioning the lid over the well-plate by aligning the pins with its corresponding well is easily designed as illustrated in FIG. 7. As long as the same rectangular array of pins that correspond to the rectangular array of wells is used, a lid 10 can be designed for use with any well-plate.

In a preferred embodiment, the thermal cycler is designed to accept from one to six plates: the plates may have either 96, 384, or 1536 wells. When fully loaded with six 1536-well plates, the system can process >9000 samples at one time.

The thermal cycler tray, onto which the plates will be placed, contains an interlock system that positions each plate precisely in the cycler. This tray indexes out to the user and can be loaded either manually or robotically with plates as illustrated in FIG. 7. When the tray is moved back into the thermal cycler, a compression screen is brought down into contact with the lid. This compression screen applies a slight pressure to the lid 10 causing it to be compressed onto the plate 99. This action compresses the rubber seal 16 around each of the wells thus making each well air and liquid tight.

Temperature control within the thermal cycler can be performed by the mixing of two air sources. The first, or "hot", air source is produced passing air over a resistive heating coil to bring the air temperature up to >250° C. The second, or "cold", air source is produced by passing air over a refrigeration unit cooling the air to 10° C. These two air sources are then mixed in the proper proportions in the vortex chamber to create air at the proper temperature. Air from the vortex chamber is then passed over the copper clad surface of the lids 10 in the sample chamber. This conditioned air then either heats or cools the copper clad surface 14 and copper pins 18 of the lid 10. As the pins heat or cool, heat is either added directly to the samples through the pins or removed directly from the samples through the pins and dissipated at the copper clad surface 14 of the lid 10.

Temperature control can also be achieved by the application of a Peltier device directly to the copper clad surface of the lid. In this case, the heating/cooling system is incorporated directly into the clamping device such that when the lid is clamped onto the plate, the Peltier device is compressed onto the copper clad surface of the lid. The application of current to the Peltier device will then heat one surface of the Peltier device while cooling the other side. Reversing the current flow will reverse the hot and cold surfaces.

As the peltier device heats up, the heat energy is transferred to the copper clad portion of the lid. Similar to the embodiment that uses air to regulate the temperature of the samples, the lid transmits its energy to the pins and eventually to the samples.

Other means of heating and cooling the lid may be used. For example, applying a metal block that has either been heated or cooled to the appropriate temperature may be used to regulate the temperature of the lid 10 and ultimately the liquid samples.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

Figure 8:
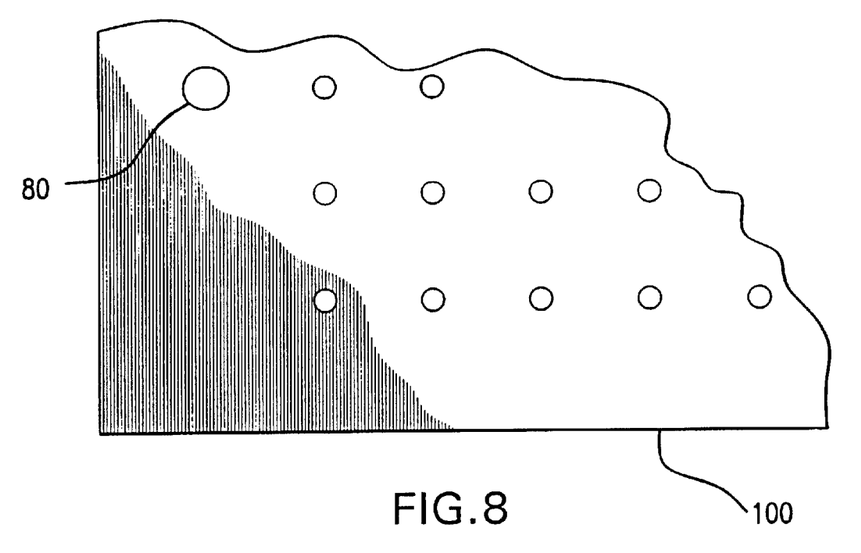
FIG. 8 is a portion of a well plate 100 having a well grid of 16 by 24 wells.
Figure 9:
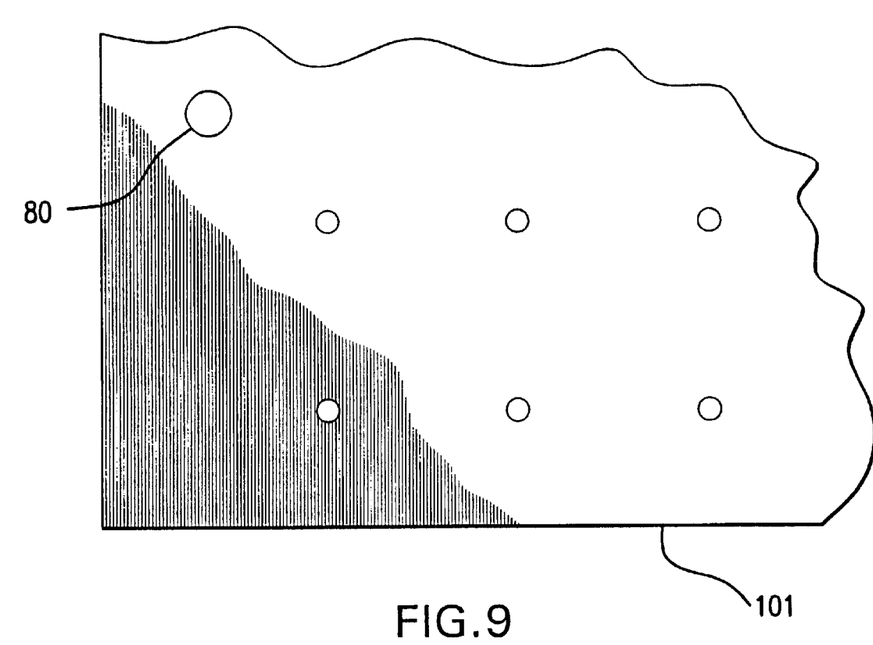
FIG. 9 is a portion of a well plate 101 having a well grid of 8 by 12 wells.
Figure 10:
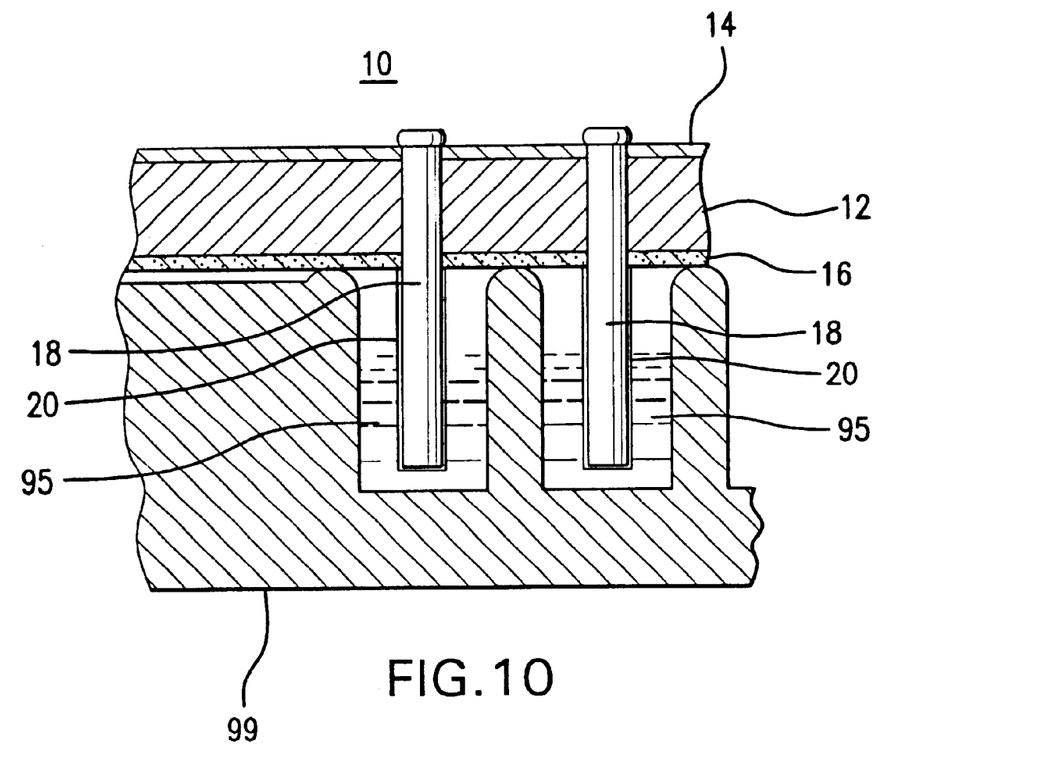
FIG. 10 is a pin 18 mounted on lid 10 having a coating 20.

FIG. 8 shows a portion of a well plate 100 having a well grid of 16 by 24 wells. FIG. 9 shows a portion of a well plate 101 having a well grid of 8 by 12 wells. FIG. 10 shows a pin 18 mounted on lid 10 having a coating 20.

What is claimed is:

1. An apparatus for controlling the temperature of a liquid sample stored in at least one well of a well plate, said apparatus comprising: a lid, said lid being configured so that said lid may contact the well-plate and thereby cover the at least one well, said lid being in thermal communication with the liquid sample such that the addition or removal of heat to or from said lid results in the addition or removal of heat to or from the liquid sample; a heat-conductive portion applied to the top of said lid; at least one heat conductive pin that communicates with said heat conductive portion of the lid, said pin adapted to be inserted into the well.

2. The apparatus of claim 1 wherein said pin has a length such that said pin extends into the well and is adapted such that said pin physically contacts the liquid sample in said well so that the heat from the lid is transferred to said pin and eventually to the liquid sample.

3. The apparatus of claim 1 wherein the number of pins equals the number of wells in the well plate.

4. The apparatus of claim 3 wherein the lid covers a well plate having a well grid of 32 wells by 48 wells.

5. The apparatus of claim 3 further comprising a coating applied over at least one of said pins that resists reaction with the liquid sample when the pin is placed in contact with the liquid sample.

6. The apparatus of claim 5 wherein said coating is a type of polymer.

7. An apparatus for controlling the temperature of a liquid sample stored in at least one well of a well plate, the apparatus comprising: a lid, said lid sized to cover the top of the well-plate; a heat-conductive portion applied to the top of said lid; said heat-conductive portion being comprised of a metal; said metal being chosen from the group of metals consisting of copper, aluminum, gold, silver, platinum, tin, lead and any combination thereof; at least one heat conductive pin that communicates with said heat conductive portion of the lid, said pin adapted to be inserted into the well; said pin has a length such that it extends into the well and is adapted such that said pin physically contacts the liquid sample in the well so that the heat from said lid is transferred to said pin and eventually to the liquid sample; and a means for heating and cooling that communicates with said lid for transferring heat to said lid.

8. The apparatus of claim 7 further comprising means for regulating the temperature of said means for heating and cooling thereby regulating the temperature of the lid.

9. An apparatus for subjecting a liquid sample to thermal cycling, the apparatus comprising:

(a) a plate having at least one well for holding the liquid;

(b) a lid that covers said plate and having a number of pins projecting in the plate, said pins projecting away from the lid towards the plate and being aligned with said wells for insertions in said wells;

(c) means for controlling the temperature of the lid and the associated pins thereby regulating the temperature of the liquid;

(d) a copper clad over the top surface of said lid.

10. The apparatus of claim 9 wherein said pins communicate with said copper clad for transferring heat along the length of the pin.

* * * * *